United States Patent [19]

Martin

[11] 4,194,182

[45] Mar. 18, 1980

[54] ELECTRICAL SWITCH CONTROLLABLE ALTERNATIVELY BY AN INTERNAL TIMER AND BY DIGITAL INFORMATION FROM A REMOTE SOURCE

[76] Inventor: James L. Martin, 4985 Dalton Dr., Ellicott City, Md. 21045

[21] Appl. No.: 827,095

[22] Filed: Aug. 23, 1977

[51] Int. Cl.² .................... H04Q 11/04; H01H 43/02
[52] U.S. Cl. .......................... 340/310 R; 340/310 A; 340/309.1
[58] Field of Search ............ 340/309.1, 309.4, 310 A, 340/310 R; 307/3; 200/33 B

[56] References Cited

U.S. PATENT DOCUMENTS

| | | | |
|---|---|---|---|
| 3,558,902 | 1/1971 | Casey | 307/3 |
| 3,729,710 | 4/1973 | Sherwin | 340/310 A |
| 3,740,680 | 6/1973 | Schneidinger | 200/33 B |
| 3,770,929 | 11/1973 | Kobayashi | 340/309.1 |
| 3,972,471 | 8/1976 | Ziegler | 340/310 A |
| 3,973,135 | 8/1976 | Scott | 340/309.1 |
| 4,007,458 | 2/1977 | Hollabaugh | 340/310 A |
| 4,012,732 | 3/1977 | Herrick | 340/309.1 |

Primary Examiner—Harold I. Pitts
Attorney, Agent, or Firm—Cushman, Darby & Cushman

[57] ABSTRACT

This invention relates to the automatic operation of electric wall switches. Through the use of electronics and mechanisms contained within the switch body, the switch operates on command of a remote digital controller, or alternatively, from an integral timer. in the former case, digital codes are transmitted on existing electrical wiring in a building to provide remote operation. When an integrated timer is utilized, the timer provides controlled turn "on" or "off" functions.

9 Claims, 8 Drawing Figures

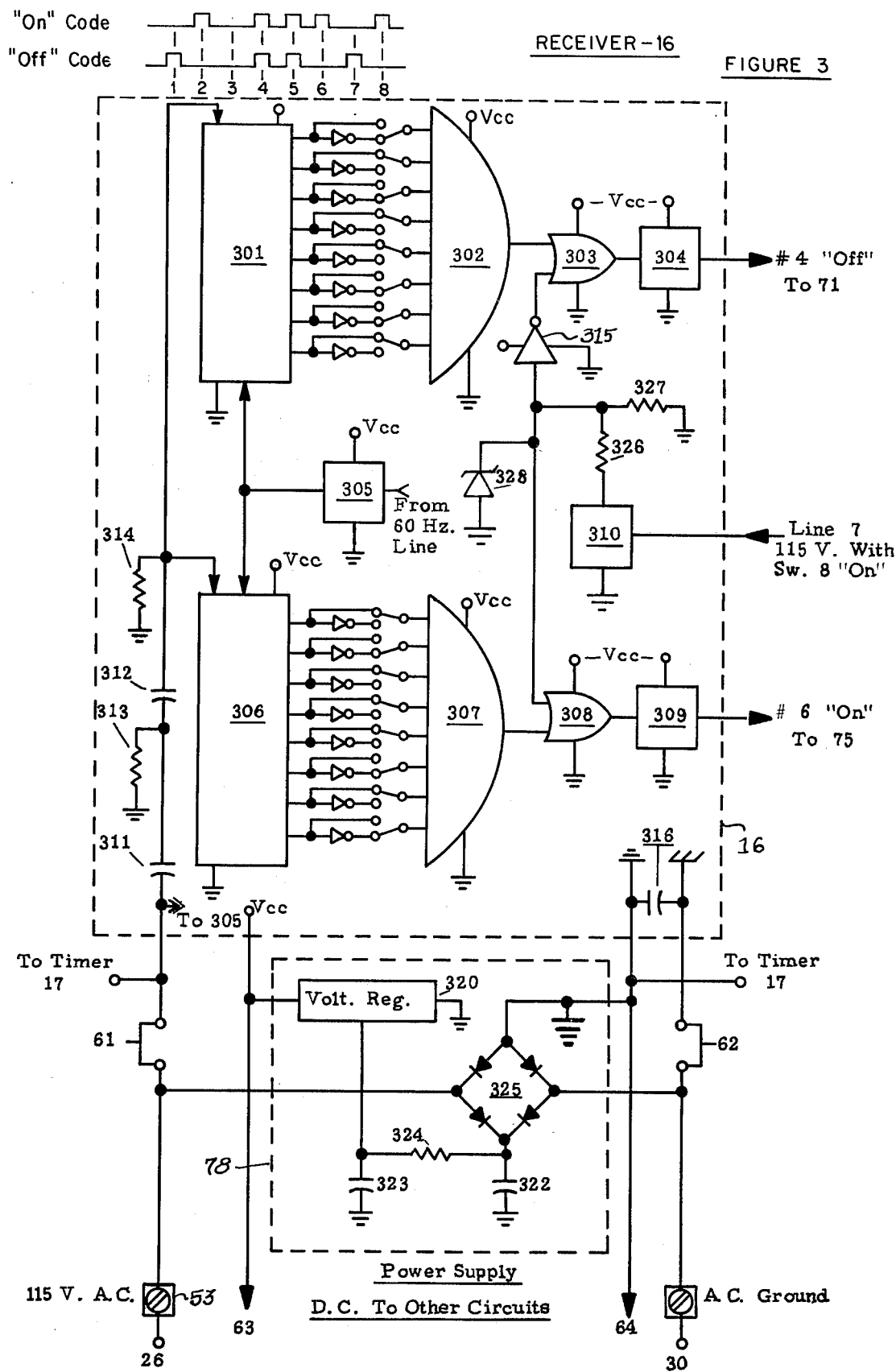

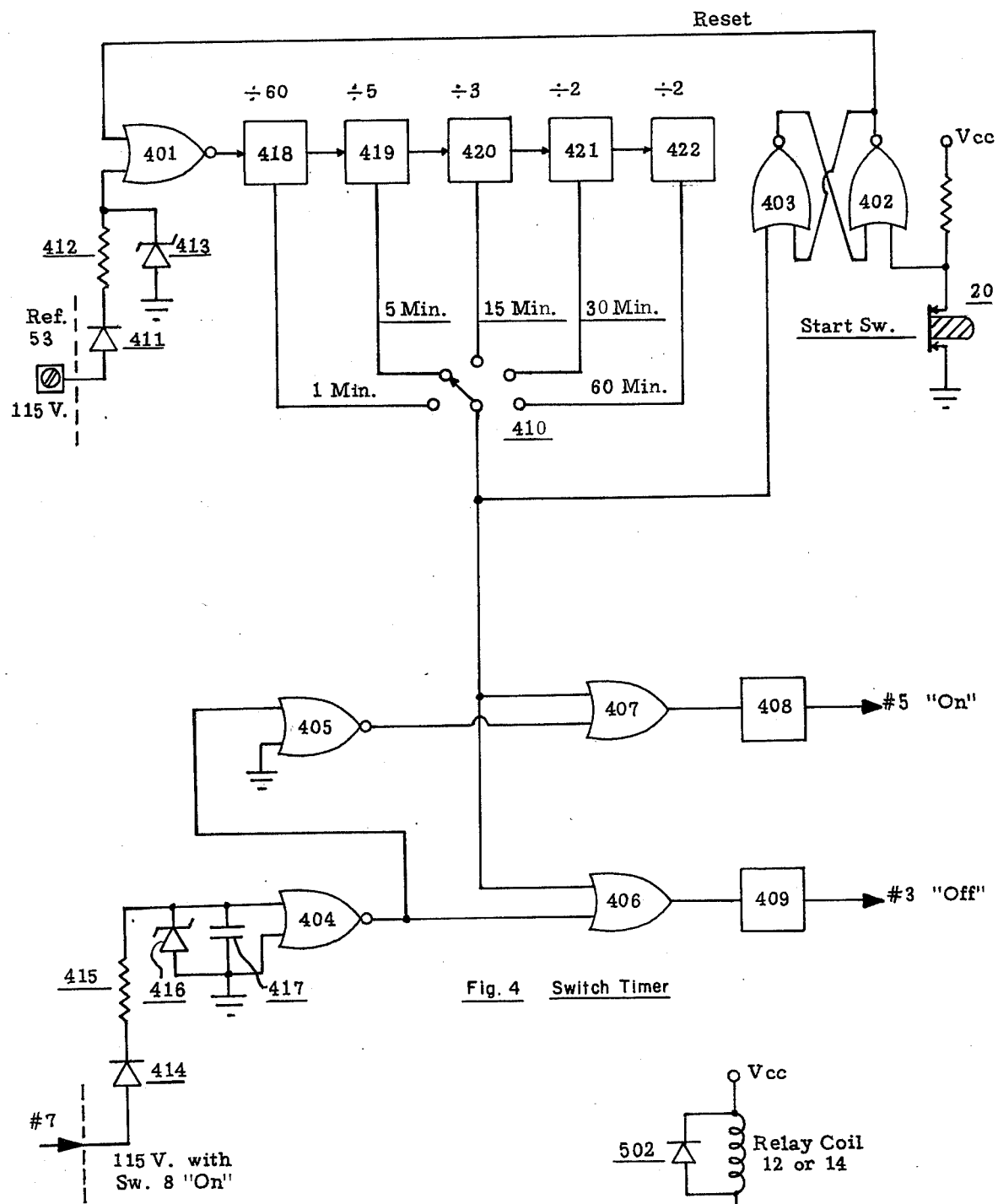
Fig. 4 Switch Timer
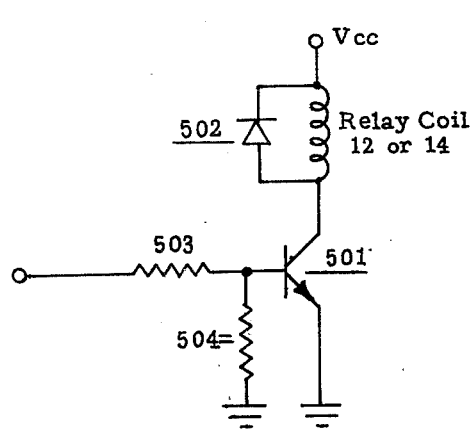
Fig. 5 Relay Driver

ELECTRICAL SWITCH CONTROLLABLE ALTERNATIVELY BY AN INTERNAL TIMER AND BY DIGITAL INFORMATION FROM A REMOTE SOURCE

BACKGROUND OF THE INVENTION

Arrangements permitting local and remote control of switches are well known. Typically, remote control is achieved by the use of signals produced by radio, light or audio sources. Additionally, such control is obtained by timer means.

Such arrangements as just outlined also have been employed to control wall switches. Examples of prior art of this type are U.S. Pat. No. 3,558,902, issued to Everett R. Casey on Jan. 26, 1971, and U.S. Pat. No. 3,740,680, which granted to Carl Schneidinger on June 19, 1973. The former discloses a wiring system employing a receiver mechanism contained within a wall box which receives a switch. The receivers are responsive to radio frequency signal transmitted over the electrical wiring of the building. U.S. Pat. No. 3,740,680 is concerned with a timer which is associated with a wall switch for operating same at desired times.

SUMMARY OF THE INVENTION

The present invention is intended to provide safety, security and convenience for the user. This is accomplished by the provision of remote operation of a wall switch allowing operation of switches at any building location from a remote point. This is accomplished without disabling the capability of manual operation of the switches and without substantially altering their outward appearance.

Of course, the invention also provides energy conservation through automatic de-activation of circuits not required.

A first automatic function according to the present invention is remote control of switch operation accomplished by a sub-miniature receiver commanded from a digital controller. The receiver responds to coded information from the digital controller, performs de-coding thereof, and provides a control function to drive a switch actuator (or other circuits to be described hereinafter). Thus, a remote signal is used to turn the switch on or off, as desired. The digital controller and receiver system generate and receive coded signals over the same wiring as is used for the building power. The receiver, actuator and switch are incorporated into an integral unit cooperating to perform automatic control of the switch.

A second automatic function is obtained through the use of the same switch and actuator mechanism as just described, but which is controlled by an integral timer. An example of this local type of automatic operation is as follows: the switch is turned "on" manually an a time delay interval is selected. When the user activates a start control, the electric lamp or other device remains on until the user has had an opportunity to pass to an area of safety, at which time the switch deactivates automatically. This type of operation prevents an unsafe act of groping through a darkened area, and saves electrical energy that otherwise would be expended if the light were left on.

The switch is designed to incorporate remote or local automatic control functions, or both, while retaining its manual operation capability. This permits the user to select the switch control best suited for his requirements.

DETAILS OF THE INVENTION

The invention now will be described in greater detail with reference to the accompanying drawings wherein:

FIG. 3 is a schematic diagram of a receiver and power supply used in the preferred embodiment of the invention;

FIG. 4 is a schematic diagram of a timer used in the preferred embodiment of this invention;

FIG. 5 is a schematic diagram of a relay driver used in the preferred embodiment of the invention;

Referring to FIGS. 1–5, the preferred embodiment of the invention will be described.

Initially, it should be noted that the automatic wall switch described hereinafter mounts into conventional, existing wall switch boxes. Consequently, its outward appearance is similar to a common toggle wall switch except for the addition of a small control knob 21 and push button 20 which is evident on face plate 22.

Figure 1:
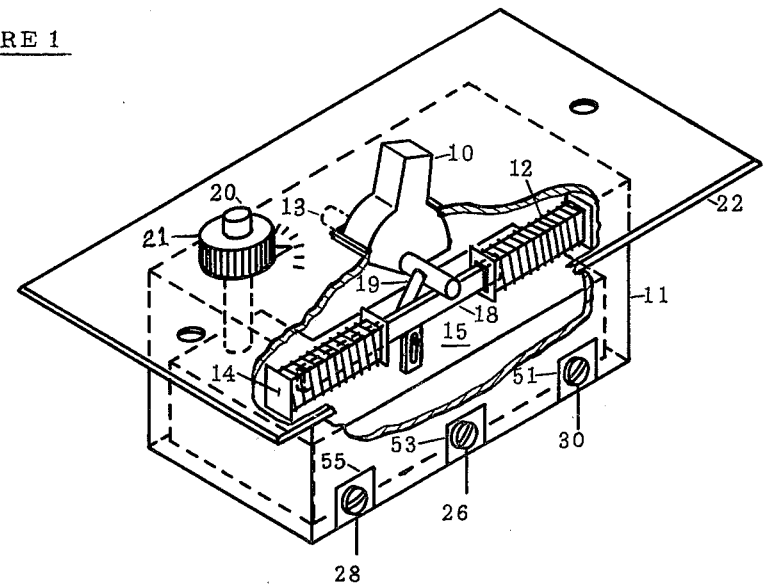
FIG. 1 is an isometric and partially cut away view of a preferred embodiment of the invention showing two solenoid coils with a common armature driving the switch toggle lever through a coupling arm.
Figure 2:
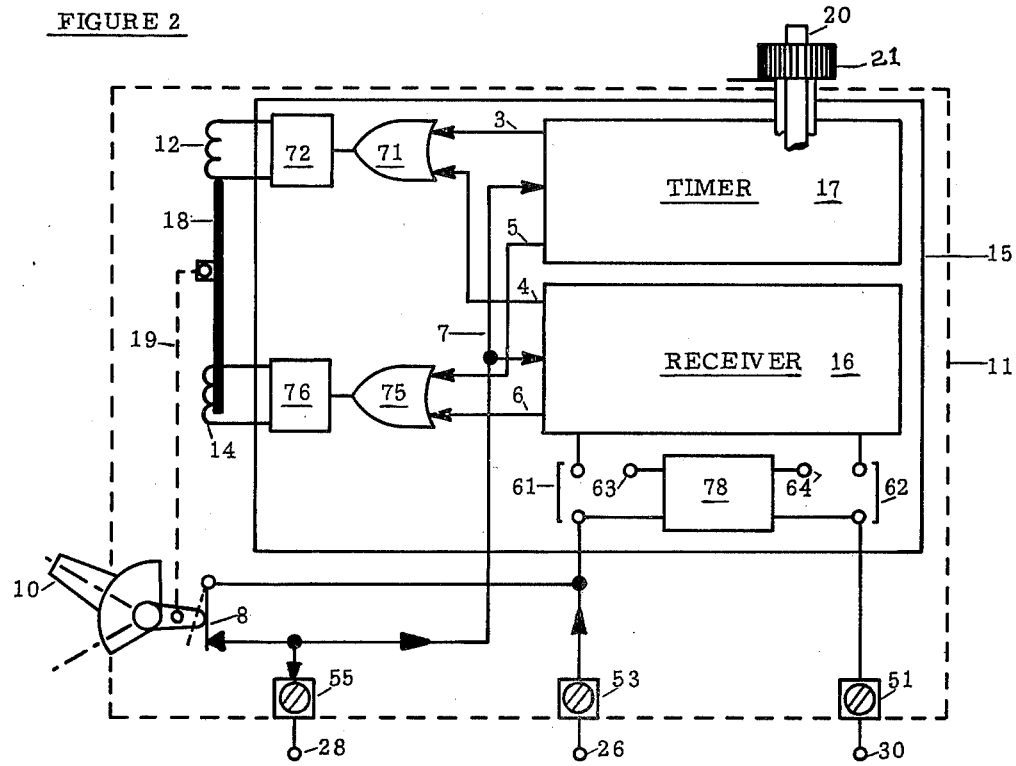
FIG. 2 is a partial block and partial schematic diagram of the automatic switch shown in FIG. 1.

Switch body 11 contains the following: a control electronics package 15 (decribed later), solenoid coils 12 and 14, and solenoid armature 18 connected to toggle shaft 13 through coupling arm 19. Power switch 8 (FIG. 2) is operated each time the toggle lever 10 is actuated, whether automatically or manually. Switch body 11 has three electrical terminals. In FIG. 2, it can be seen that the 115 volt line 26 enters on terminal 53. It then goes to power switch 8 and exits on terminal 55 to line 28 which continues to the device, such as a lamp, which is being controlled. Internally, from terminal 53, the 115 volt line goes to a D.C. power supply 78. An A.C. ground line 30 is tapped and brought in on terminal 51 and taken to D.C. power supply 78. Thus, the electronics contained in switch body 11 derives its power from the line. D.C. power is taken from supply 78 (shown in detail in FIG. 3) to the receiver 16, timer 17, OR gates 71 and 75, and to relay drivers 72 and 76.

Manual operation of the switch is considered understood by all in that movement of toggle lever 10 actuates electric power switch 8, through shaft 13. The electrical contact detail of switch 8 is not shown, as this is a well practiced art in many forms, including mercury switches.

When toggle switch 10 is moved, the motion is transferred via coupling arm 19 to common solenoid armature 18. Conversely, when either solenoid coil is energized, magnetic force pulls the armature 18 into the respective energized coil 12 or 14. This motion is transferred through coupling arm 19 to toggle lever 10 via shaft 19, thereby operating the switch.

Automatic operation of the switch will be described intially from a functional standpoint. Such operation of the switch is provided by internal receiver 16, or timer 17, contained in electronics package 15, both of which provide two outputs. Lines 5 and 6 are connected in a manner to turn the power switch 8 ON and lines 3 and 4 are employed to turn the switch OFF. The receiver 16 (shown in detail in FIG. 3) receives its command signals over the power line when terminals 61 and 62 are connected. The timer 17 (shown in FIG. 4) divides the power line frequency to provide signals that turn the switch ON or OFF in accordance with a delay interval selectable with timer set knob 21. Either sequence of operation begins when push botton 20 is actuated. An OR circuit 75 receives ON signals from receiver 16 on line 6 and from timer 17 on line 5. When either signal is present at an input to OR circuit 75, an output is produced to turn on relay driver 76. The same functions apply with OR circuit 71 and relay driver 72 to produce an OFF switch condition. Relay drivers 72 and 76 provide the energizing current for solenoid coils 13 and 14, respectively.

In remote operation of the switch by digital signals transmitted over the power line to receiver 16, the receiver recognizes only unique coded ON or OFF commands from a remote digital controller that has injected these signals into the building power wiring. Thus, the user can command the switch at any time to turn ON or OFF by selecting and sending a particular code for any given switch. All remote controlled switches in one building may be coded alike, if desired, to permit all lights to be operated simultaneously or each switch may have a separate code for independent operation.

The internal timer 17 permits the user to select a delay time interval after which the switch will automatically operate. An example of this sequence is to assume the wall switch is ON, and the user selects a 5-minute delay interval with knob 21. When he pushes button 20, the timing sequence begins and 5 minutes later, the wall switch turns OFF. The opposite sequence occurs when the wall switch is initially OFF and the user actuates start button 20, the wall switch turns ON after a 5-minute delay interval. Time intervals mentioned in this disclosure are by no means limiting, for as will be seen, a frequency divider chain can be designed to provide a large number of discrete steps of delay, from seconds to hours. The timer used may be of any circuit design that can be fitted into the switch body.

Referring now primarily to FIG. 3, details of the receiver 16 will be described. It will be assumed that an eight bit binary digital code has been impressed on the building wiring. The receiver circuitry will decode only the proper code and will provide an output for either turning the wall switch ON or OFF.

The binary digital code is received on 115 V. A.C. line 26 and passes through terminal 53 and jumper connection 61. The low frequency carrier (60 Hz) is largely filtered by capacitors 311 and 312 along with resistors 313 and 314. These are chosen to form a high pass filter at the frequency of the code transmission, e.g., 10 KHz or higher, and to highly attenuate the 60 Hz line voltage carrier. A clock 305 is synchronized with the digital controller at the 60 Hz line frequency.

The coded signals are connected to two 8 bit serial to parallel converters, 301 and 306, each of which is a type of shift register controlled by clock 305. Assuming an ON command signal is received, clock 305 transfers the code into successive stages of shift register 306 until the first bit arrives at the last stage of the register. At this time, all eight bits are in the register. A dual output is provided at each stage, one inverted and one normal, which outputs are called Q and $\overline{Q}$. When the Q output is a logic 1, or high, the $\overline{Q}$ is a logic 0, or low, and vice versa. Thus, it is feasible to connect the Q and $\overline{Q}$ in outputs of the register stages in an arrangement that corresponds to the digital code received so as to obtain all 1's, or highs. These are fed in parallel to AND gate 307 which produces a logic 1, or high output. This output is connected to OR gate 308. The output of OR gate 308 is assumed to be initially at logic 0, or low, when the input signal arrives from AND gate 307. When gate 308 then responds to the logic 1 output of gate 307, it produces a logic 1, or high, which is connected to a one shot multivibrator 309. The one shot circuit 309 produces a discrete pulse, logic 1, which is then fed to OR circuit 75 (FIG. 2). As described above with respect to FIG. 2, the output of circuit 75 is directed to relay driver 76 so as to momentarily energize relay coil 14. This action pulls armature 18 into relay coil 14, thereby moving switch 8 to the ON position. At this time, terminal 55 and line 28 are energized and the light or device being operated by switch 8 is turned on. A line 7, joined to the switched A.C. line near terminal 55 (FIG. 2) is connected to a rectifier circuit 310 in the receiver (FIG. 3) which, with resistors 326, 327 and zener diode 328, are associated to develop a logic 1, or high, when the power switch is ON. This logic 1 is coupled to OR circuit 308 and inverter amplifier 315. As a result, the OR circuit 308 produces a constant logic 1 or high, as long as power switch 8 is on, thereby preventing any additional signal which may arrive at the receiver from producing a transition signal to turn on one shot circuit 309. This means that the switch 8 can be turned OFF remotely only by the appropriate receiver circuitry comprising 301, 302, 304 and 315.

The OFF circuitry operates the same way as described previously with respect to the ON operation except as the OFF circuitry is controlled by the connections between the 8 bit serial to parallel converter 301 and the 8 input AND gate 302 as well as the influence created by inverter amplifier 315 which is used to insure that OR gate 303 remains locked up once it is energized, thereby inhibiting further OFF signals. When switch 8 is off, there is no signal produced by rectifier 310, and thus no signal at the input of 315. This condition automatically produces a logic 1, or high output, which keeps OR gate 303 on continuously, preventing any signal transition that would operate a one shot multivibrator 304 which is joined via OR circuit 71 (FIG. 2) to control the energization of relay coil 12.

Capacitor 316 is used to connect the A.C. ground to receiver ground for the purpose of providing control signals. The ground symbol shown on the diagram refers to D.C. ground within the receiver and power supply circuits.

The 8 bit serial to parallel converters 301 and 306 are chosen to provide high immunity from false codes, or from transients on the line. The use of such converters also provides over 250 combinations of codes which allows unique remote switching of circuits within large buildings. While two converters are shown in FIG. 3 for the sake of clarity, it is apparent that in practice, only one is required. Furthermore, other logic elements may be used for a digital receiver, the present embodiment being but one example thereof.

The power supply 78, shown with the receiver in FIG. 3, includes a common diode bridge rectifier circuit 325 with filter capacitors 322 and 323 and resistor 324 making up a D.C. filter circuit. Regulator circuit 320 is used to control the D.C. output voltage for all the control circuits within the switch body. The symbol used for the output of power supply 78 is the conventional term Vcc, used throughout these descriptions.

A schematic diagram of the electronic timer used in the automatic switch is presented in FIG. 4. Timing is achieved by division of the power line frequency to provide either ON and OFF delay periods.

As can be seen in FIG. 3, A.C. power from line 26 is brought to terminal 53 and passed through jumper 61 to the timer 17. Also, A.C. ground is provided for the timer from the same terminal as shown in the receiver schematic, terminal 64, and Vcc is supplied from power supply 78 and terminal 63.

Referring now to FIG. 4, it can be seen that the input on the 60 Hz A.C. line to the timer is rectified by diode 411, thereby developing a half cycle pulse which is attenuated by resistor 412 and clamped to 4 volts by zener diode 413. This 4 volt, 60 Hz pulse is fed to NOR gate 401 before reaching the frequency divider chain made up of divider circuits 418 through 422. NOR gate 401 provides an output only when both input lines are at logic 0, or low. During a timing interval, the reset line is logic 0, or low, and the input signal is also logic 0, or low during one half cycle. Thus, gate 401 will produce one output pulse per cycle. When the timer has completed its timing interval, a logic 1, or high, is fed back to gate 401 on the reset line, locking it and preventing additional count information from passing to the divider chain until reset button 20 is manually actuated.

The 60 Hz pulses from gate 401 are first fed to divider 418. This is shown as a divide by 60 device on the schematic. However, in practice it is made up of two dividers cascaded to obtain the same result. Divider 418 provides one output pulse every 60 seconds which can be selected by appropriate setting of timer set knob 21 and switch 410 to which knob 21 is joined. As shown in FIG. 4, the next divider step, which is 5 minutes, has been selected by switch 410. Divider 419 divides the 60 second pulse by five and produces one pulse every five minutes. Switch 410 directs this pulse to three gates, OR gates 406 and 407, and NOR gate 403. Assuming that reset switch 20 has been actuated, gate 401 has allowed pulses to reach the divider chain, and divider 410 has just reached the end of its 5 minute interval, divider 419 will produce a logic 1, or high output. This output first resets NOR gates 402 and 403 which have been in a logic 0, or low output state, to a logic 1, or high state, resetting the counter chain to zero and locking NOR gate 401, preventing further counting. Now assuming further that toggle switch 10 was ON, and the intent was to turn the switch OFF after the selected timing interval, the following takes place. With the power switch ON, a logic 1, or high is produced by A.C. voltage being fed to diode 414, resistor 415 and zener diode 416, and being filtered by capacitor 417. This logic 1 condition at NOR gate 404 input produces a logic 0, or low output from gate 404 which is applied to OR gate 406 which, along with a logic 1, or high, from switch 410 on the other input to gate 406, produces a logic 1, or high output which is coupled to a one shot multivibrator 409. The one shot 409 produces a discrete pulse, a logic 1, or high, on line 3 coupled to OR gate 71 (FIG. 2). As a result, OR gate 71 produces a logic 1, or high, which turns on relay driver 72 producing a pulse of current in solenoid coil 12, thereby turning the switch OFF.

Since the same timing interval pulse is directed to both the ON and OFF OR gates, 406, 407, respectively, a means of selecting which one is to automatically operate has to be provided. This is accomplished by the A.C. supplied from power switch 8, via line 7, to control gate 404 and to provide the sense for operating the correct gate 406 or 407. In the discussion of the preceding paragraph in which the toggle switch 10 was ON, a means of opening gate 406 was described. Likewise, a means of insuring that OR gate 407 is closed under such circumstances also is necessary. This is accomplished by NOR gate 405 which produces a constant logic 1, or high, when toggle switch 10 is ON, since NOR gate 404 has been set thereby at a logic 1, or low output. When NOR gate 405 is held at a logic 1, or high output, OR gate 407 is also held at a logic 1, or high output, and therefore is unable to produce a pulse transition to operate a one slot multivibrator 408. Thus the A.C. fed from power switch 8 automatically determines whether the timer turns ON or OFF after the user operates starts switch 20.

The user may restart the timing sequence at any time by pressing start switch 20, even though the timing sequence is well under way.

The automatic turn ON sequence is largely a duplication of the turn OFF sequence just discussed. It is apparent from the preceding discussion how gates 404, 405 and 407 produce an ON condition when power switch 8 is OFF. When this occurs, the logic 1, or high, from one shot 408 is fed to line 5 and to OR gate 75 (FIG. 2) thereby energizing relay driver 76 and relay 14 to produce an ON condition at the end of the timing sequence.

As in the case of FIG. 3, all gates, dividers and one shots shown in FIG. 4 are connected to Vcc and ground to obtain power for their operation.

Referring to FIG. 5, the relay driver 72 (or 76) of FIG. 2 is shown in detail. The relay driver is an NPN transistor 501 with relay coil 12 (or 14) located in the collector circuit. Diode 502 clamps the back EMF which occurs when the coil is de-energized, thereby preventing breakdown of the transistor. Resistor 503 limits the current that transistor 501 draws and resistor 504 is used to hold the transistor base at ground potential in the absence of a signal. A momentary logic 1, or high pulse from OR gate 71 (or 75) turns the transistor on to provide current to energize the coil and actuate the switch 10.

Figure 6:
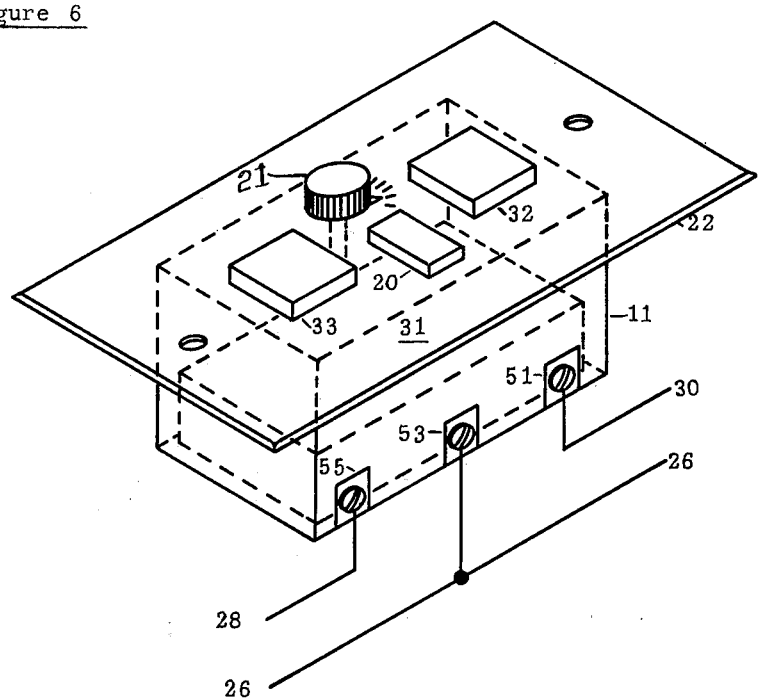
FIG. 6 is an isometric view of an alternative embodiment of the invention employing a solid state switch to perform similar functions to those of the preferred embodiment.
Figure 7:
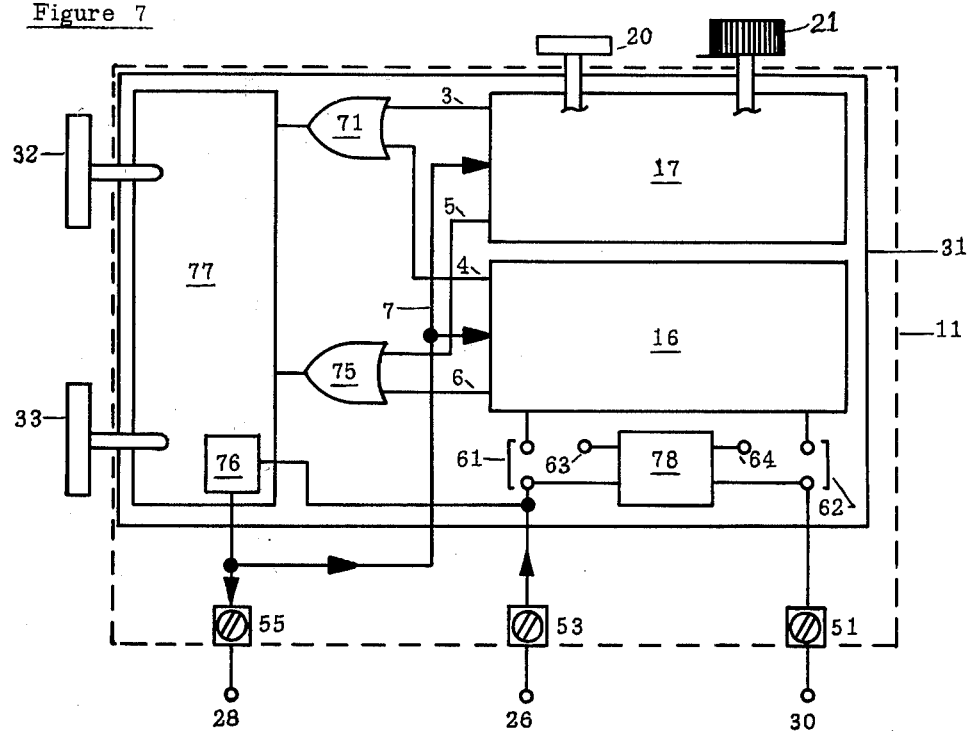
FIG. 7 is a partial block and partial schematic diagram of the solid state switch shown in FIG. 6.
Figure 8:
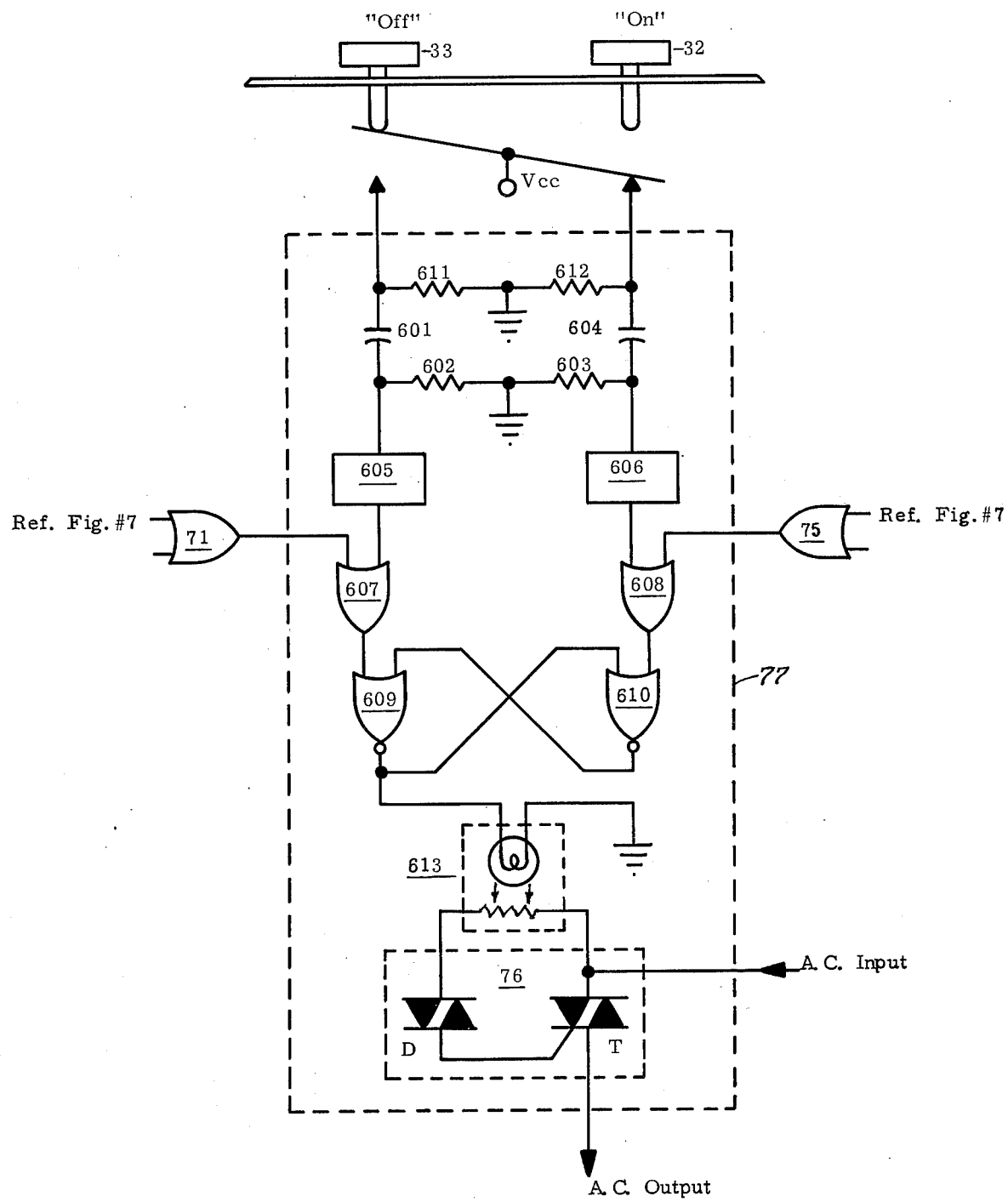
FIG. 8 is a schematic diagram of the solid state switch module forming a portion of the switch shown in FIG. 7.

An alternate embodiment of the invention, which accomplishes automatic power switch operation with solid state devices, is illustrated in FIGS. 6–8. The operation of this switch is very similar to that described with respect to FIGS. 1–5.

In FIG. 6, switch face plate 22 covers switch body 11, which contains an electronic package 31. This version of the automatic wall switch uses touch switches for manual operation, an ON switch 32 and an OFF switch 33. Time delay is set by control knob 21, and the timer is started by momentarily touching start button 20.

Automatic operation of the switch is the same as previously described for the embodiment of FIGS. 1–5 as to the receiver, timer, power supply and OR gates 71 and 75. The principal difference resides in the switch control package 77 (FIG. 7) the details of which are shown in FIG. 8.

Referring to FIG. 8, touch switches 32 and 33 do not directly control the electrical output, but rather supply logic signals which control a solid state electrical switch 76. This diagram shows electrical switch contacts associated with switches 32 and 33. However, other forms of touch switches may be used to supply logic signals directly to the circuits shown.

The solid state switch 76 includes a Triac, labeled "T", which, along with the Diac "D", switch the A.C. line when commanded. The switching control for the Triac is a photocell and light source contained in package 613. When the light is on, the photocell resistance greatly decreases, allowing the Diac to trigger the Triac, thereby passing A.C. to the receiver 16 and timer 17. As in the case of the embodiment of FIGS. 1-5, the receiver and timer provide control signals for OR gates 71 and 75, and the function of the gates is the same as previously described. This is representative circuitry only, as many types of control are known for operation of solid state power switching circuits.

Again referring to FIG. 8, OR gate 607 is the control for an automatic or a manual OFF signal, while OR gate 608 performs the ON control function. When either gate 607 or gate 608 provides a signal to its associated NOR gate 609 or 610, respectively, the latter gates latch with one gate output at logic 1 and the other having a logic 0 output. The state of these gates depends on which signal is received last. Assuming the switch 33 is OFF, the output of 609 is a logic 0, and the light 613 is not energized. This condition exists when gate 609 has one input at logic 1, and the other at logic 0, meaning that gate 610 output is at logic 1, or high. When the manual switch 32 is pressed ON, a signal to a one shot multivibrator 606 is produced as capacitor 604 charges. Resistors 603 and 612 insure that capacitor 604 is discharged when the switch is in the opposite position. When one shot 606 fires, it produces a logic 1 signal to OR gate 608 which passes it to NOR gate 610. Since NOR gate 610 now has two logic 1's on its input, the output of gate 610 goes to logic 0. With two logic 0's on the input of NOR gate 609, it produces a logic 1 output and latches in this mode. The light in 613 is thereby energized and the Triac is switched on, as previously described. The opposite sequence takes place when an OFF signal is supplied from the receiver, timer or manual switch 33.

What is claimed is:

1. An automatically controlled electric switch adapted to be received within a wall-mounted switch body joined by electrical wiring to a source of alternating current, said switch comprising:
   switching means;
   a receiver responsive to digitally coded electrical information transmitted from a remote location via the electrical wiring and superimposed on the alternating current for producing an electrical signal;
   means operatively related to the receiver and said switching means for actuating the switching means in response to said signal; and
   means for operating the switching means manually from outside the switch body.

2. An automatically controlled electric switch as set forth in claim 1, wherein the receiver means includes digital logic circuitry.

3. An automatically controlled electric switch as set forth in claim 2, wherein said actuating means comprises an electro-mechanical device joined to the logic circuitry and the switching means, said electro-mechanical device being operative whereby the electrical signal produced by said circuitry is converted by the device to physical displacement of the switching means.

4. An automatically controlled electric switch as set forth in claim 3, wherein said actuating means comprises additional logic circuitry joined to the logic circuitry of the receiver and to the switching means; and wherein said switching means comprises an electronic switch, said additional logic circuitry being operative whereby the electrical signal produced by the receiver logic circuitry is converted by the additional logic circuitry to a further electrical signal for controlling the state of said electronic switch.

5. An automatically controlled electric switch as set forth in claim 1, further comprising:
   an adjustable time delay device joined to the actuating means for selectively actuating the switching means independently of the generation of an electrical signal by said receiver.

6. An automatically controlled electric switch as set forth in claim 5, wherein said actuating means includes:
   logic circuitry connected with the receiver and the time delay device; and
   an electro-mechanical device joined to the logic circuitry and the switching means, said electro-mechanical device being operative in response to an electrical output of said logic circuitry for converting the output to physical displacement of the switching means.

7. An automatically controlled electric switch as set forth in claim 5, wherein said switching means comprises an electronic switch and wherein said actuating means includes:
   logic circuitry connected with the receiver and the time delay device; and
   additional circuitry joined to the logic circuitry and the switching means, said additional circuitry being operative in response to an electrical output of said logic circuitry for converting said output to a further electrical signal for controlling the state of said electronic switch.

8. An automatically controlled electric switch as set forth in claim 5, wherein said time delay device is electrically operated by an A.C. power source connected thereto, said device including:
   a frequency divider for dividing the frequency of the source to establish a plurality of time delay intervals; and
   adjustable means connected to said divider for selecting desired delay intervals.

9. An automatically controlled electric switch as set forth in claim 5, wherein said actuating means includes a touch-responsive control for starting a sequence of operation of the time delay device.

* * * * *